United States Patent
Li et al.

(10) Patent No.: US 12,080,938 B2
(45) Date of Patent: Sep. 3, 2024

(54) ANTENNA APPARATUS AND ELECTRONIC DEVICE

(71) Applicant: Honor Device Co., Ltd., Shenzhen (CN)

(72) Inventors: Yuanpeng Li, Shenzhen (CN); Xiaotao Cai, Shenzhen (CN); Tiezhu Liang, Shenzhen (CN); Dawei Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 246 days.

(21) Appl. No.: 17/611,037

(22) PCT Filed: May 13, 2020

(86) PCT No.: PCT/CN2020/089969
§ 371 (c)(1),
(2) Date: Nov. 12, 2021

(87) PCT Pub. No.: WO2020/228728
PCT Pub. Date: Nov. 19, 2020

(65) Prior Publication Data
US 2022/0311127 A1  Sep. 29, 2022

(30) Foreign Application Priority Data

May 14, 2019 (CN) .......................... 201910399233.6
May 23, 2019 (CN) .......................... 201910435982.X

(51) Int. Cl.
*H01Q 1/24* (2006.01)
*H01Q 1/36* (2006.01)
(Continued)

(52) U.S. Cl.
CPC ............... *H01Q 1/243* (2013.01); *H01Q 1/36* (2013.01); *H01Q 1/44* (2013.01); *H01Q 1/50* (2013.01);
(Continued)

(58) Field of Classification Search
CPC ...... H01Q 1/243; H01Q 1/44; H01Q 1/50–52; H01Q 5/321–328; H01Q 5/30
See application file for complete search history.

(56) References Cited

U.S. PATENT DOCUMENTS 9,748,638 B2 * 8/2017 Wei ........................ H01Q 1/243
10,381,721 B2   8/2019 Wang et al.
(Continued)

FOREIGN PATENT DOCUMENTS

CN    103346397 A    10/2013
CN    105337052 A    2/2016
(Continued)

*Primary Examiner* — Hasan Islam
(74) *Attorney, Agent, or Firm* — Conley Rose, P.C.

(57) ABSTRACT

An antenna apparatus includes a first side metal frame having a first slot and a first feed point, and a bottom metal frame having a second slot and a second feed point. A first ground point is arranged between the bottom metal frame and a second side metal frame of the electronic device. The apparatus also includes a plurality of tuning switches including a first tuning switch connected to the first side metal frame, and a second tuning switch and a third tuning switch connected to the bottom metal frame. The second tuning switch is connected to a first side of the second slot, the third tuning switch is connected to a second side of the second slot, and the first side is closer to the first side metal frame than the second side. A feeder selectively connects to the first feed point or the second feed point.

12 Claims, 16 Drawing Sheets

(51) Int. Cl.
*H01Q 1/44* (2006.01)
*H01Q 1/50* (2006.01)
*H01Q 5/10* (2015.01)
*H01Q 5/28* (2015.01)
*H01Q 5/321* (2015.01)
*H01Q 5/328* (2015.01)
*H01Q 21/28* (2006.01)

(52) U.S. Cl.
CPC .............. *H01Q 5/10* (2015.01); *H01Q 5/28* (2015.01); *H01Q 5/321* (2015.01); *H01Q 5/328* (2015.01); *H01Q 21/28* (2013.01)

(56) References Cited

U.S. PATENT DOCUMENTS

| | | | |
|---|---|---|---|
| 10,461,405 | B2 | 10/2019 | Xiong |
| 10,476,167 | B2 | 11/2019 | Ayala Vazquez et al. |
| 10,931,008 | B2 * | 2/2021 | Qiu ................. H01Q 5/328 |
| 11,069,955 | B2 * | 7/2021 | Ying ................. H01Q 5/378 |
| 2013/0135157 | A1 | 5/2013 | Tsou et al. |
| 2016/0064820 | A1 | 3/2016 | Kim et al. |
| 2018/0026361 | A1 | 1/2018 | Sakong et al. |
| 2018/0269583 | A1 | 9/2018 | Pajona et al. |
| 2018/0358699 | A1 | 12/2018 | Li et al. |
| 2019/0027833 | A1 | 1/2019 | Ayala et al. |
| 2022/0311127 | A1 | 9/2022 | Li et al. |

FOREIGN PATENT DOCUMENTS

| | | |
|---|---|---|
| CN | 105826652 A | 8/2016 |
| CN | 106848594 A | 6/2017 |
| CN | 108199132 A | 6/2018 |
| CN | 108270082 A | 7/2018 |
| CN | 108631041 A | 10/2018 |
| CN | 108649335 A | 10/2018 |
| CN | 109149134 A | 1/2019 |
| CN | 208368722 U | 1/2019 |
| CN | 109547594 A | 3/2019 |
| CN | 110165373 A | 8/2019 |
| EP | 3229316 A1 | 10/2017 |
| JP | 2019022218 A | 2/2019 |
| WO | 2016106779 A1 | 7/2016 |

* cited by examiner

FS (portrait mode)

BHH (landscape mode)

ANTENNA APPARATUS AND ELECTRONIC DEVICE

This application is a U.S. National Stage of International Patent Application No. PCT/CN2020/089969 filed on May 13, 2020, which claims priority to Chinese Patent Application No. 201910399233.6, filed with the China National Intellectual Property Administration on May 14, 2019, and Chinese Patent Application No. 201910435982.X, filed with the China National Intellectual Property Administration on May 23, 2019, all of which are incorporated herein by reference in their entireties.

TECHNICAL FIELD

The present invention relates to the field of antenna technologies, and in particular, to an antenna apparatus applied to an electronic device.

BACKGROUND

To enhance a quality sense of a mobile electronic device (such as a mobile phone), metal is increasingly applied to industrial design (ID) of the mobile electronic device, for example, a metal frame. In the industrial design using a metal frame, designing the metal frame as an antenna has become an antenna design direction.

In the prior art, a slot with a small width (for example, 1 mm to 1.5 mm) is arranged on the metal frame, and the slot divides the metal frame into a plurality of parts to form a plurality of metal frame antennas. When the metal frame is in an open environment, there is air outside the metal frame, so that radiation performance of the metal frame antenna is good. However, when a human body touches the slot on the metal frame, such as holding the slot in the hand, load of the human body absorbs the antenna radiation, significantly reducing radiation efficiency of the antenna.

SUMMARY

Embodiments of the present invention provide an antenna apparatus in which a metal frame is designed as an antenna, which can take into account both free space radiation efficiency and handheld radiation efficiency.

According to a first aspect, this application provides an antenna apparatus. The antenna apparatus may include: a side metal frame 11-1, a bottom metal frame 11-7, a feeder 23, and a plurality of tuning switches connected to the metal frame.

A slot 21-1 may be arranged on the side metal frame 11-1, and a slot 22 may be arranged on the bottom metal frame 11-7. Here, the side metal frame 11-1 may be referred to as a first side metal frame, the bottom metal frame 11-7 may be referred to as a bottom metal frame, the slot 21-1 may be referred to as a first slot, and the slot 22 may be referred to as a second slot.

The plurality of tuning switches may include a first tuning switch arranged on the side metal frame 11-1, such as a tuning switch 25 (SW2) shown in FIG. 4A. The plurality of tuning switches may further include a second tuning switch and a third tuning switch that are arranged on the bottom metal frame 11-7. The second tuning switch may be arranged on a first side of the slot 22, and the third tuning switch may be arranged on a second side of the slot 22. The first side is closer to the side metal frame 11-1 than the second side.

The side metal frame 11-1 may be provided with a feed point S, and the bottom metal frame 11-7 may be provided with a feed point T. The feeder 23 can be configured to selectively connect the feed point S or the feed point T. The feed point S may be referred to as a first feed point, and the feed point T may be referred to as a second feed point.

It can be learned that the antenna provided in the first aspect is a metal frame antenna. Slots are arranged on both the side metal frame and the bottom metal frame, and the side metal frame and the bottom metal frame are separately fed based on different scenes, so as to switch between a portrait mode and a landscape mode. In this way, in a free space scene, the portrait mode of the metal frame is strong and free space radiation efficiency is high; in a handheld scene, a landscape mode of the metal frame is strong and handheld radiation efficiency is high.

With reference to the first aspect, in some embodiments, the feeder 23 can separately feed the side metal frame and the bottom metal frame based on the scene, so as to switch between the portrait mode and the landscape mode. In the free space FS scene, the feeder 23 may be connected to the feed point S on the side metal frame 11-1. In the handheld (such as BHH) scene, the feeder 23 may be connected to the feed point T on the bottom metal frame 11-7.

With reference to the first aspect, in some embodiments, the feeder 23 may be connected to the switch 22 (SW1). The switch 22 may have two stationary terminals: a stationary terminal A (which may be referred to as a first stationary terminal) and a stationary terminal B (which may be referred to as a second stationary terminal). The feed point S is connected to the stationary terminal A of the switch 22. The feed point T is connected to the stationary terminal B of the switch 22. The switch 22 can be configured to selectively connect the feeder 23 to the feed point S or the feed point T by turning on different stationary terminals. The switch 22 (SW1) may be referred to as a first switch.

With reference to the first aspect, in some embodiments, in the free space FS scene, the switch 22 may turn on the stationary terminal A. In this case, the feeder 23 is connected to the feed point S of the side metal frame 11-1, and the side metal frame 11-1 is fully excited and can be used as a radiator to generate radiation outwards. A radiation mode is a portrait mode, and free space radiation efficiency is good. In this case, the first tuning switch (such as the tuning switch 25) arranged on the side metal frame 11-1 can be configured to switch a radiation frequency band of the side metal frame 11-1, for example, switch between low frequency bands such as LTE B5, LTE B8, and LTE B28.

With reference to the first aspect, in some embodiments, in the handheld (such as BHH) scene, the switch 22 may turn on the stationary terminal B. In this case, the feeder 23 is connected to the feed point T of the bottom metal frame 11-7, and the bottom metal frame 11-7 can be used as a radiator to generate radiation outwards. A radiation mode is a landscape mode, which is not affected by holding the slot 21-1 in the hand, and the handheld radiation efficiency is good. The second tuning switch and the third tuning switch can be configured to switch the radiation frequency band of the bottom metal frame 11-7.

With reference to the first aspect, in some embodiments, to ensure that in the landscape mode, the bottom metal frame 11-7 is used as a radiator to generate radiation outwards, and prevent the bottom metal frame 11-7 and a side metal frame 11-3 connected to the bottom metal frame 11-7 from forming a whole radiator for generating radiation, a first ground point such as a ground point 35 (GND1) may be arranged between the side metal frame 11-3 and the bottom metal frame 11-7.

With reference to the first aspect, in some embodiments, to isolate the side metal frame 11-1 and the bottom metal frame 11-7 and avoid interference between the portrait mode and the landscape mode, a second ground point such as a ground point 33 (GND2) may be further arranged between the feed point S and the feed point T. Optionally, the tuning switch 27 (SW3) may be switched to 0 ohm grounding instead of the ground point 33 (GND2).

With reference to the first aspect, in some embodiments, a feed point Q may be arranged on the side metal frame 11-3. A slot 21-3 may be arranged on the side metal frame 11-3. The feeder 23 can be configured to connect the side metal frame 11-3 when connecting the side metal frame 11-1. That is, in the free space FS scene, both the side metal frame 11-3 and the side metal frame 11-1 may be used as radiators in the portrait mode, so as to further improve the free space radiation efficiency. Here, the side metal frame 11-3 may be referred to as a second side metal frame, the feed point Q may be referred to as a third feed point, and the slot 21-3 may be referred to as a third slot.

According to a second aspect, this application provides an electronic device. The electronic device may include a metal frame, the antenna apparatus described in the first aspect, and a logic control circuit. The logic control circuit can be configured to control a feeder 23 to connect a first feed point arranged on a side metal frame 11-1, or connect a second feed point arranged on a bottom metal frame 11-7.

With reference to the second aspect, in some embodiments, the logic control circuit can be connected to a first switch, and can be specifically configured to control the first switch to turn on a stationary terminal A (which may be referred to as a first stationary terminal) or to turn on a stationary terminal B (which may be referred to as a second stationary terminal).

According to a third aspect, this application provides an antenna radiation method. The method can be applied to the electronic device described in the second aspect. The method includes: the electronic device can determine a current scene. When it is determined that the electronic device is in a free space scene, the electronic device can control the feeder 23 to connect a first feed point. When it is determined that the electronic device is in a handheld scene, the electronic device can control the feeder 23 to connect a second feed point.

With reference to the third aspect, in some embodiments, that the electronic device controls the feeder 23 to connect the first feed point may specifically include: the electronic device controls a first switch to turn on a stationary terminal A (which may be referred to as a first stationary terminal).

With reference to the third aspect, in some embodiments, that the electronic device controls the feeder 23 to connect the second feed point may specifically include: the electronic device controls a first switch to turn on a stationary terminal B (which may be referred to as a second stationary terminal).

According to a fourth aspect, this application provides an antenna apparatus. The antenna apparatus may include: a side metal frame 11-1, a bottom metal frame 11-7, a feeder 23, and a plurality of tuning switches connected to the metal frame.

A slot 21-1 may be arranged on the side metal frame 11-1. A slot 50 may be arranged on the bottom metal frame 11-7. Here, the side metal frame 11-1 may be referred to as a first side metal frame, the bottom metal frame 11-7 may be referred to as a bottom metal frame, the slot 21-1 may be referred to as a fourth slot, and the slot 50 may be referred to as a fifth slot.

The feeder 23 may be connected to a feed point P. Here, the feed point P may be referred to as a fourth feed point. The feed point P may be arranged on the metal frame between the slot 21-1 and the slot 50. Specifically, the feed point P may be arranged on the bottom metal frame between the slot 21-1 and the slot 50, as shown in FIG. 6A. The metal frame between the slot 21-1 and the slot 50 may include two parts. One part is the bottom metal frame between the slot 21-1 and the slot 50, and the other part is the side metal frame between the slot 21-1 and the slot 50.

The plurality of tuning switches may include a fifth tuning switch such as a tuning switch 51 (SW8) in FIG. 6A, and a sixth tuning switch such as a tuning switch 55 (SW9) in FIG. 6A. The fifth tuning switch (such as SW8) may be arranged on the metal frame between the slot 21-1 and the slot 50. The sixth tuning switch (such as SW9) may be arranged on the bottom metal frame 11-7. The fifth tuning switch may be arranged on a first side of the feed point P, and the sixth tuning switch may be arranged on a second side of the feed point P. The first side is closer to the side metal frame 11-1 than the second side. Specifically, the sixth tuning switch and the feed point P may be separated by the slot 50. The fifth tuning switch can be configured to selectively turn off or on, and the sixth tuning switch can be configured to selectively turn off or on.

In the second aspect, switching the tuning switch to an off (off) state may mean that the tuning switch is in a disconnected state. Switching the tuning switch to an on (on) state may mean that the tuning switch turns on a specific lumped device. For example, the tuning switch turns on a 0 ohm lumped device to implement closed grounding.

It can be learned that, according to the antenna design solution provided in the fourth aspect, under the condition that slots are arranged on both the side metal frame and the bottom metal frame, the state (such as the on (on) state or the off (off) state) of the tuning switch connected to the metal frame is changed to adjust whether the radiation mode of the metal frame antenna is a landscape mode or a portrait mode, so as to take into account both the free space radiation efficiency and the handheld radiation efficiency. The tuning switch may be switched to the on (on) state by switching to 0 ohm grounding, and therefore the on (on) state may also be referred to as a grounded state. The tuning switch in the off (off) state can be used for frequency modulation.

With reference to the fourth aspect, in some optional embodiments, the plurality of tuning switches may further include a seventh tuning switch, such as a tuning switch 53 (SW7). The seventh tuning switch may be arranged at a position adjacent to the feed point P on the metal frame between the slot 21-1 and the slot 50, and can be used for impedance matching of the feeding. Because the radiator in the portrait mode and the radiator in the landscape mode are different, the antenna impedance is different, and impedance matching for different transmission lines is needed.

With reference to the fourth aspect, in some optional embodiments, if the fifth tuning switch is turned off and the sixth tuning switch is turned on, the side metal frame 11-1 is fully excited and can be used as a main radiator to generate radiation outwards. In this case, the working mode of the metal frame antenna is the portrait mode, and the free space radiation efficiency is good. The fifth tuning switch can be further configured to switch the radiation frequency band of the side metal frame 11-1 in the portrait mode, for example, switch between low frequency bands such as LTE B5, LTE B8, and LTE B28.

With reference to the fourth aspect, in some optional embodiments, if the fifth tuning switch is turned on and the sixth tuning switch is turned off, the bottom metal frame 11-7 is fully excited and can be used as a main radiator to generate radiation outwards. In this case, the working mode of the metal frame antenna is the landscape mode, which is not affected by holding the slot 21-1 in the hand, and the handheld radiation efficiency is good. The sixth tuning switch (such as SW9) can be further configured to switch the radiation frequency band of the bottom metal frame 11-7 in the landscape mode, for example, switch between low frequency bands such as LTE B5, LTE B8, and LTE B28.

With reference to the fourth aspect, in some optional embodiments, the feed point P may be arranged on the side metal frame between the slot 21-1 and the slot 50. In this case, the fifth tuning switch on the first side of the feed point, such as the tuning switch 51 (SW8), is also arranged on the side metal frame between the slot 21-1 and the slot 50 accordingly. Optionally, the sixth tuning switch on the second side of the feed point, such as the tuning switch 55 (SW9), and the feed point P may no longer be separated by the slot 50.

With reference to the fourth aspect, in some embodiments, to ensure that in the landscape mode, the bottom metal frame 11-7 is used as a radiator to generate radiation outwards, and prevent the bottom metal frame 11-7 and a side metal frame 11-3 connected to the bottom metal frame 11-7 from forming a whole radiator for generating radiation, a ground point such as a ground point 35 (GND1) in FIG. 6A may be arranged between the side metal frame 11-3 and the bottom metal frame 11-7.

According to a fifth aspect, this application provides an electronic device. The electronic device may include a metal frame, the antenna apparatus described in the fourth aspect, and a logic control circuit. The logic control circuit can be configured to control the fifth tuning switch to turn off or turn on, and to control the sixth tuning switch to turn off or turn on.

According to a sixth aspect, this application provides an antenna radiation method. The method can be applied to the electronic device described in the fifth aspect. The method includes: the electronic device can determine a current scene. When it is determined that the electronic device is in a free space scene, the electronic device can control the fifth tuning switch to turn off and the sixth tuning switch to turn on. When it is determined that the electronic device is in a handheld scene, the electronic device can control the fifth tuning switch to turn on and the sixth tuning switch to turn off.

With reference to the third aspect or the sixth aspect, in some embodiments, the electronic device can determine the current scene in the following manners: In a manner, the electronic device can determine whether a handset is turned on, and if the handset is turned on, it can be determined that a user is holding the electronic device in the hand to make a call, so that the current scene can be determined to be a handheld scene; otherwise, the current scene can be determined to be a free space scene. In another manner, the electronic device can determine whether the user is close to the electronic device based on distance data collected by an optical proximity sensor from the user to the electronic device. If a distance indicated by the distance data is less than a specific threshold (for example, 1 cm), it can be determined that the user is holding the electronic device in the hand close to the user's body (for example, the user's head), so that the current scene can be determined to be a handheld scene; otherwise, the current scene can be determined to be a free space scene.

BRIEF DESCRIPTION OF DRAWINGS

To describe the technical solutions in the embodiments of this application more clearly, the following describes accompanying drawings required for describing the embodiments of this application.

DESCRIPTION OF EMBODIMENTS

The following describes the embodiments of the present invention with reference to the accompanying drawings in the embodiments of the present invention.

The technical solutions provided in this application are applicable to an electronic device that uses one or more of the following communications technologies: a Bluetooth (bluetooth, BT) communications technology, a global positioning system (global positioning system, GPS) communications technology, a wireless fidelity (wireless fidelity, Wi-Fi) communications technology, a global system for mobile communications (global system for mobile communications, GSM) communications technology, a wideband code division multiple access (wideband code division multiple access, WCDMA) communications technology, a long term evolution (long term evolution, LTE) communications technology, a 5G communications technology, a SUB-6G communications technology, another future communications technology, and the like. In this application, the electronic device may be a mobile phone, a tablet computer, a personal digital assistant (personal digital assistant, PDA), or the like.

Figure 1:
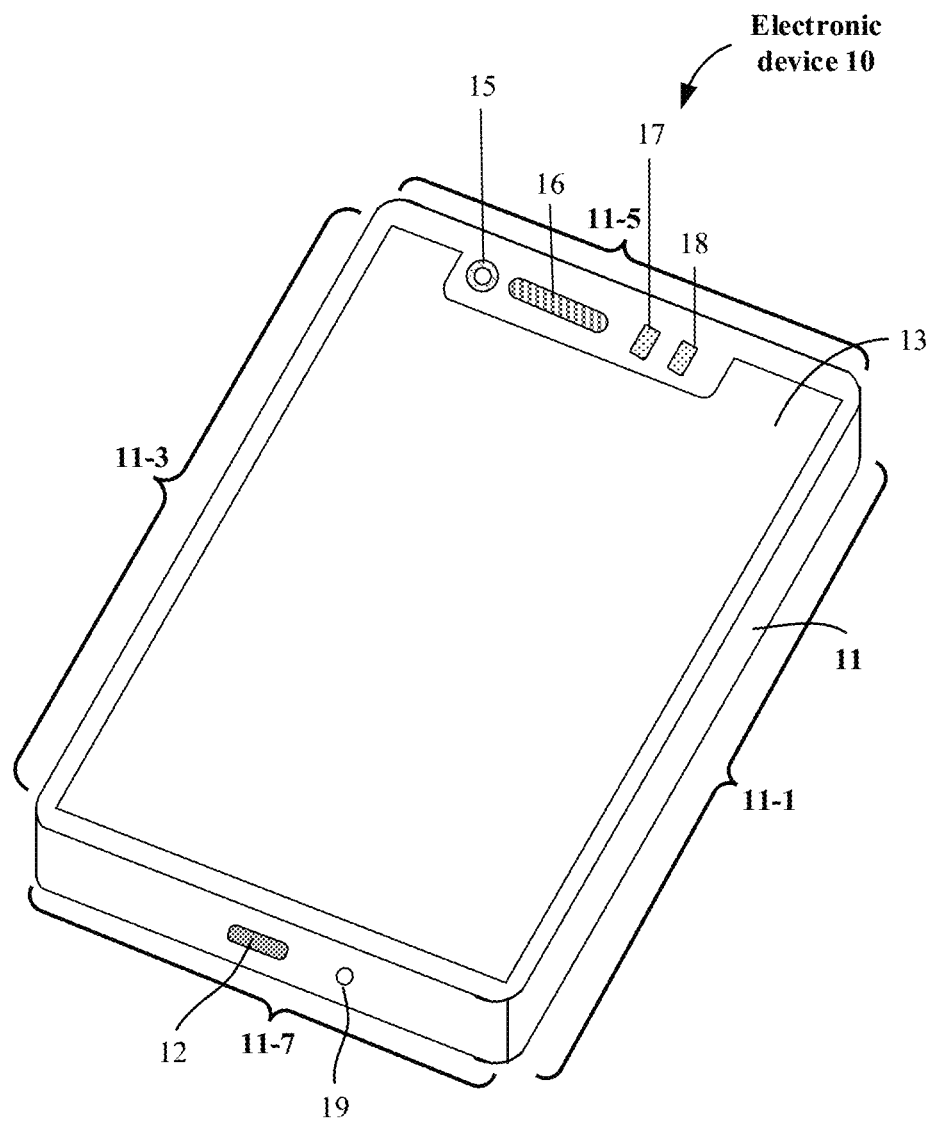
FIG. 1 is a schematic structural diagram of an electronic device on which an antenna design solution is based according to this application.

FIG. 1 shows an example of an electronic device 10 on which an antenna design solution is based according to this application. As shown in FIG. 1, the electronic device 10 may include a display screen 13 and a metal frame 11. Although not shown in the figure, the electronic device 10 may further include a back cover, a printed circuit board (printed circuit board, PCB), and a PCB ground plate.

The display screen 13 may be combined with a touch sensor to form a touch-controlled screen (or touchscreen). The touch sensor may also be referred to as a touch panel or a touch-sensitive panel.

The metal frame 11 may be made of a metal material such as stainless steel or aluminum. The metal frame 11 may extend around a periphery of the electronic device 10 and the display screen 13, and can be configured to fix the display screen 13. From the perspective of the position, the metal frame 11 may include: a metal frame 11-5 on the top of the electronic device 10 (which may be referred to as a top metal frame), a metal frame 11-7 at the bottom of the electronic device 10 (which may be referred to as a bottom metal frame), and metal frames 11-1 and 11-3 (which may be referred to as side metal frames) on the sides of the electronic device 10. The top of the electronic device 10 may be provided with a front camera 15, a handset 16, an optical proximity sensor 17, an ambient light sensor 18, and the like. The bottom of the electronic device 10 may be provided with a USB charging port 12, a microphone, and the like. The side of the electronic device 10 may be provided with a volume adjustment button (not shown) and a power button (not shown).

The PCB may be an FR-4 dielectric board, a Rogers (Rogers) dielectric board, a mixed dielectric board of Rogers and FR-4, or the like. Here, FR-4 is a code name of a flame-resistant material grade, and Rogers dielectric board is a high-frequency board. The PCB ground plate is grounded and may be arranged between the PCB and the back cover 19. The PCB ground plate may also be referred to as a PCB bottom plate. Specifically, the PCB ground plate may be a layer of metal etched on a surface of the PCB. The PCB ground plate can be used for grounding of electronic elements carried on the PCB. Specifically, the electronic elements carried on the PCB can be grounded by wiring to the PCB ground plate, so as to prevent a user from getting electric shock or device damage.

The back cover may be a back cover made of an insulating material, such as a glass back cover or a plastic back cover. The back cover may alternatively be a metal back cover. If the electronic device 10 is an all-metal ID electronic device, the back cover is a back cover made of a metal material.

The metal frame 11 may be designed as an antenna of the electronic device 10. In this case, a slot with a small width (for example, 1 mm to 1.5 mm) may be arranged on the metal frame 11. The slot may be filled with materials such as polymers, ceramics, glass, or a combination of these materials.

Figure 2A:
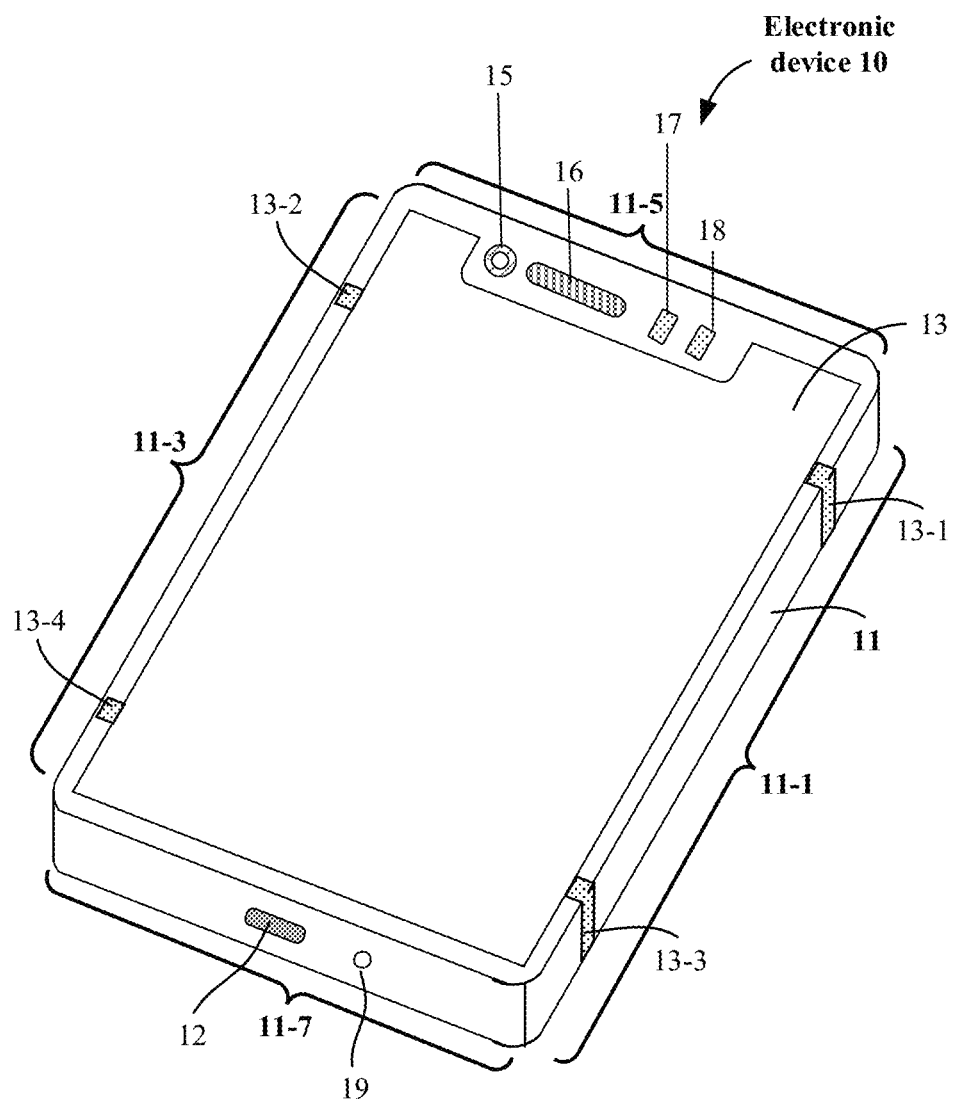
FIG. 2A and FIG. 2B are schematic diagrams of two existing antenna design solutions.
Figure 2B:
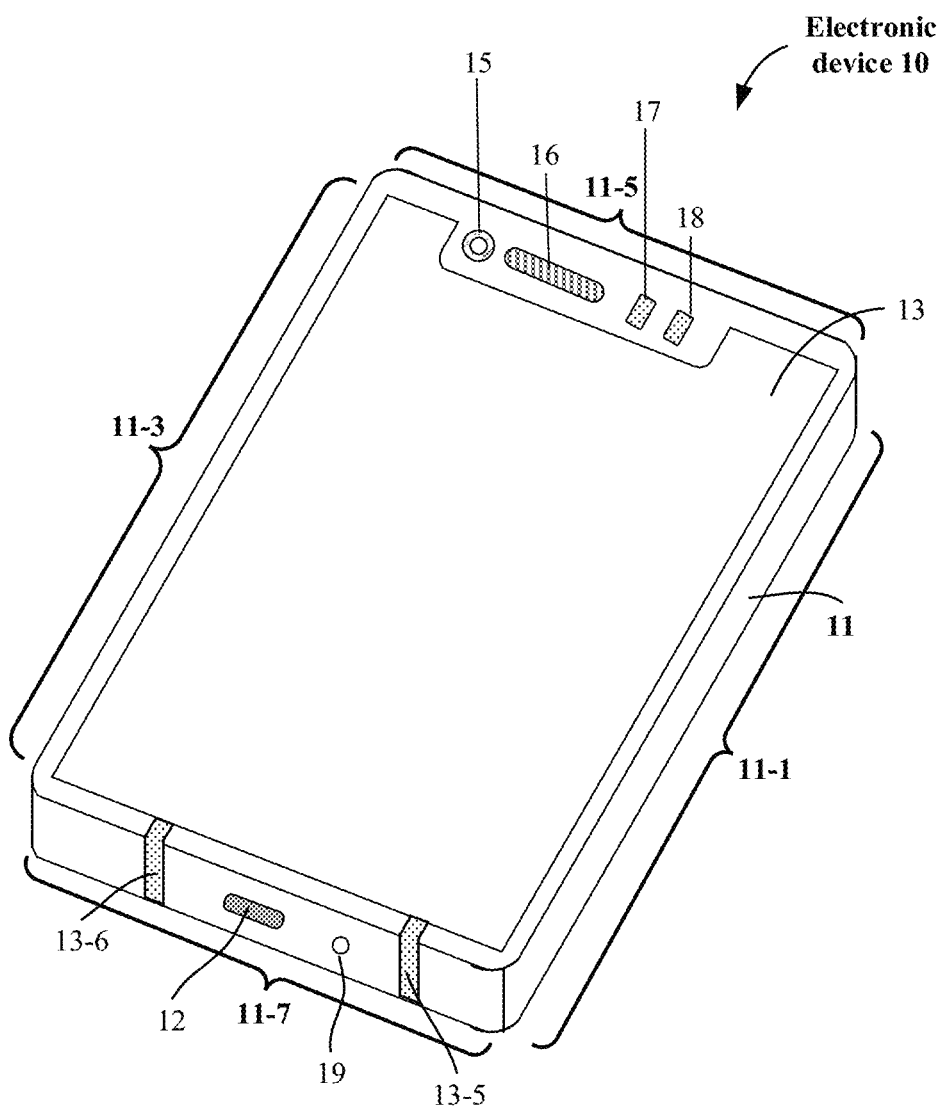

FIG. 2A and FIG. 2B respectively show two existing solutions for using a metal frame as an antenna. In the existing solution shown in FIG. 2A, slots are arranged on the side metal frames 11-1 and 11-3, such as a slot 13-1, a slot 13-2, a slot 13-3, and a slot 13-4. In the existing solution shown in FIG. 2B, slots are arranged on the bottom metal frame 11-7, such as a slot 13-5 and a slot 13-6.

In the existing solution shown in FIG. 2A, slots are arranged on the side metal frames, and therefore the portrait mode is strong and the free space (free space, FS) is good. Here, the portrait mode may refer to a radiation mode in which a longitudinal side metal frame is used as a main radiator to radiate outwards. However, when the user holds the electronic device 10 in the hand, the hand holds the slot on the side metal frame, and consequently the radiation efficiency of the antenna significantly decreases. In the existing solution shown in FIG. 2B, slots are arranged on the bottom metal frame, and therefore the landscape mode is strong, and the user holding the electronic device 10 in the hand does not affect the radiation performance of the bottom metal frame. Here, the lateral mode may refer to a radiation mode in which a lateral bottom metal frame is used as a main radiator to radiate outwards. However, the free space of the metal frame antenna shown in FIG. 2B is poor.

Figure 3:
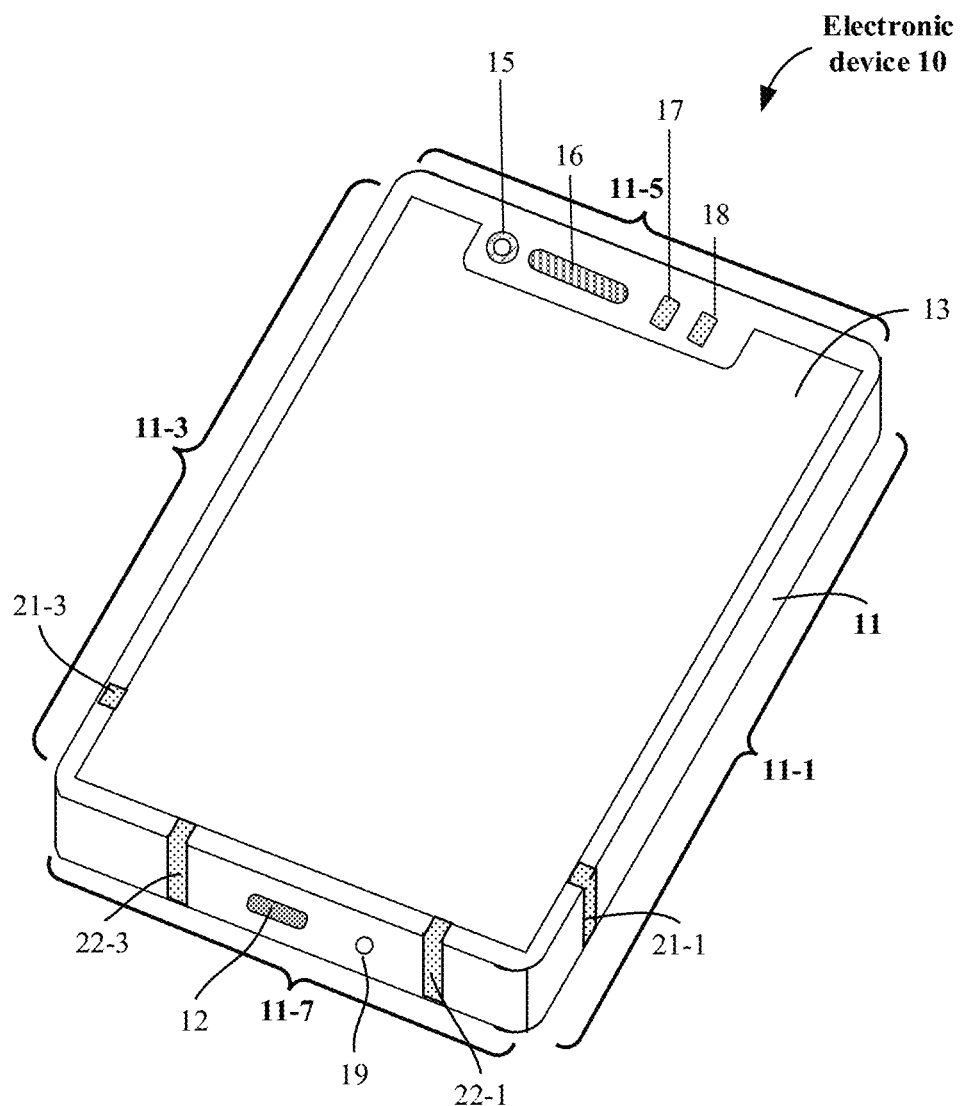
FIG. 3 is a schematic diagram of an antenna design solution according to this application.

The antenna design solution provided in this application takes into account both free space radiation efficiency and handheld radiation efficiency. The handheld radiation efficiency may include the radiation efficiency of the antenna when the electronic device 10 is held in the hand or the electronic device 10 is held in the hand close to a human head. When the electronic device 10 is held in the hand close to a human head, the radiation efficiency of the antenna may also be referred to as radiation efficiency of the beside head and hand (beside head and hand, BHH). As shown in FIG. 3, in the antenna design solution provided in this application, slots are arranged on both the bottom metal frame and the side metal frame to balance the free space radiation efficiency and the handheld radiation efficiency, so that the portrait mode of the antenna is strong and the free space radiation efficiency is good. In addition, when the electronic device 10 is held in the hand, the landscape mode of the antenna is strong, and the handheld radiation efficiency is good. FIG. 3 shows only an example of a manner of arranging slots on both the side metal frame and the bottom metal frame. For example, a slot 21-1 is arranged on the side metal frame 11-1, a slot 21-3 is arranged on the side metal frame 11-3, and slots 22-1 and 22-3 are arranged on the bottom metal frame. In subsequent embodiments, other antenna design solutions provided in this application are further described.

In this application, the free space scene may be a scene in which the electronic device 10 is not held in the hand by the user. In this scene, the side metal frame, especially the slot on the side metal frame, is not touched by a human body (such as handheld contact). In this application, the handheld scene may be a scene in which the user holds the electronic device 10 in the hand, or holds the electronic device in the hand close to the human head. In this scene, the side metal frame, such as the slot on the side metal frame, is touched by a human body (such as handheld contact).

In a free space scene, the antenna design solution provided in this application can ensure that the portrait mode of the metal frame is strong and the free space radiation efficiency is high. In a handheld scene, the antenna design solution provided in this application can ensure that the lateral mode of the metal frame is strong and the handheld radiation efficiency is high.

The following describes in detail an antenna apparatus provided in each embodiment of this application.

Embodiment 1

In this embodiment, a metal frame of an electronic device (such as a mobile phone) is designed as an antenna, and the antenna may be referred to as a metal frame antenna. Slots are arranged on both a side metal frame and a bottom metal frame, and the side metal frame and the bottom metal frame are separately fed based on different scenes, so as to switch between a portrait mode and a landscape mode.

Figure 4A:
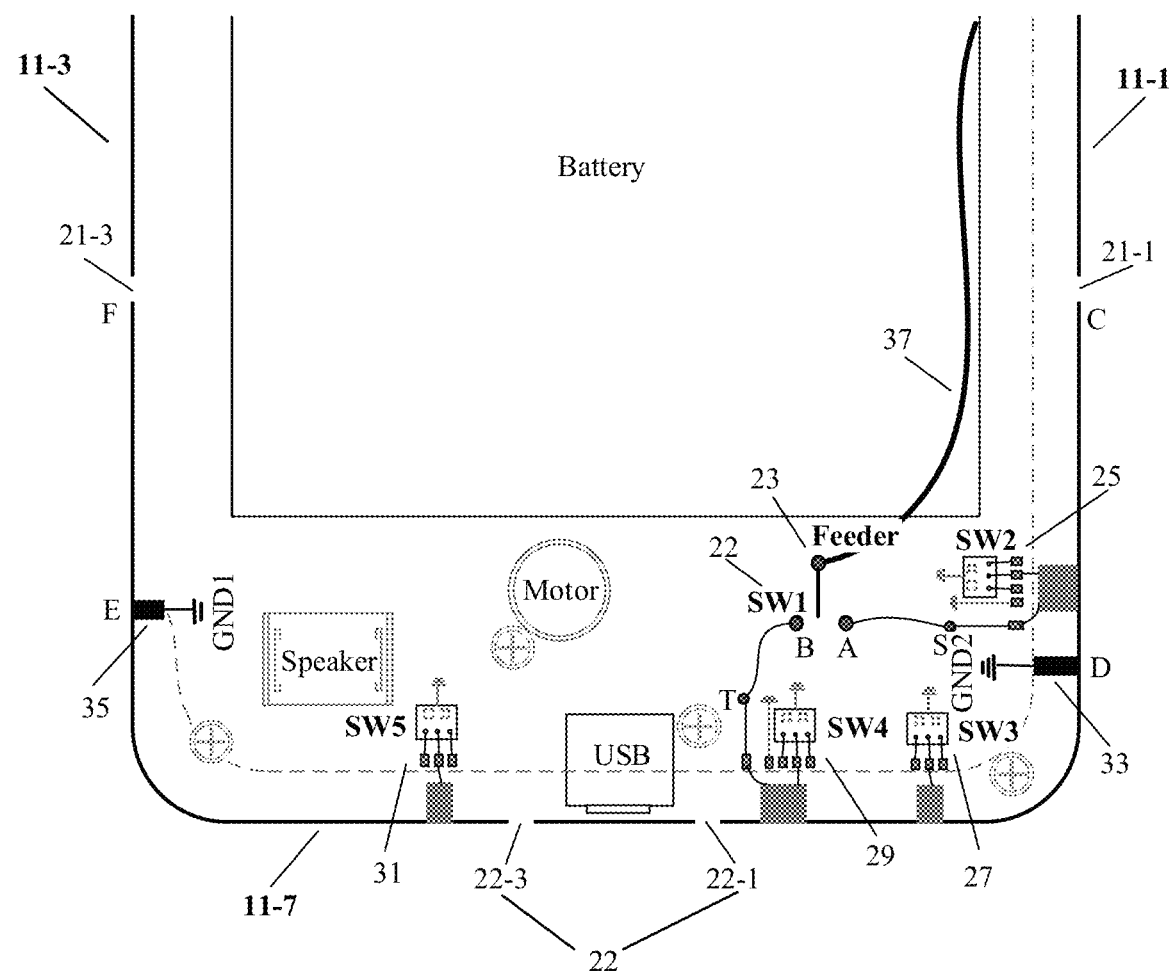
FIG. 4A is a schematic diagram of an antenna apparatus according to Embodiment 1.
Figure 4B:
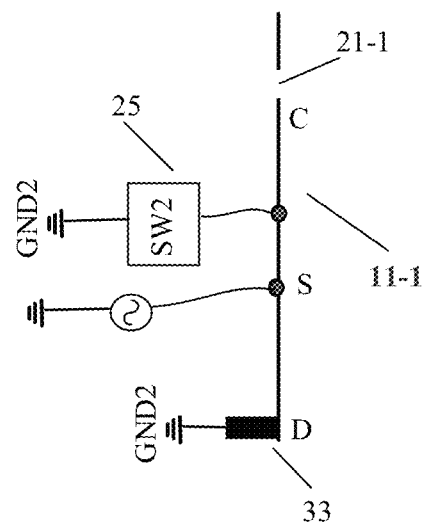
FIG. 4B is a schematic diagram of a principle of an antenna apparatus in a portrait mode according to Embodiment 1.
Figure 4C:
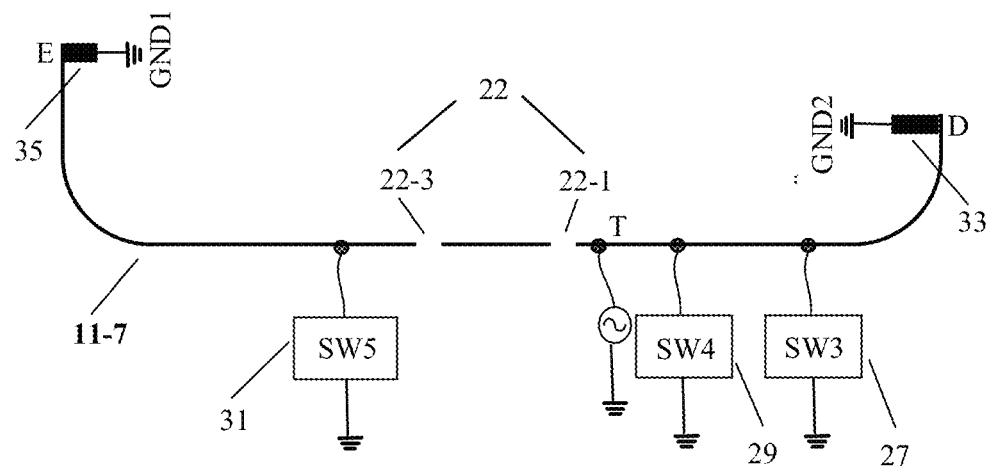
FIG. 4C is a schematic diagram of a principle of an antenna apparatus in a lateral mode according to Embodiment 1.

FIG. 4A to FIG. 4C show examples of an antenna apparatus according to Embodiment 1. FIG. 4A is a schematic diagram of an antenna model of a metal frame antenna designed in an electronic device. FIG. 4B is a schematic diagram of a principle of the antenna apparatus in a portrait mode. FIG. 4C is a schematic diagram of a principle of the antenna apparatus in a landscape mode. As shown in FIG. 4A to FIG. 4C, the antenna apparatus may include: a side metal frame 11-1, a bottom metal frame 11-7, a feeder 23, and a plurality of tuning switches connected to the metal frame.

A slot 21-1 may be arranged on the side metal frame 11-1, and a slot 22 may be arranged on the bottom metal frame 11-7. Here, the slot 21-1 may be referred to as a first slot, and the slot 22 may be referred to as a second slot. The slot 22 may include two slots: a slot 22-1 and a slot 22-3. Optionally, the slot 22 may alternatively be a single slot, that is, only the slot 22-1 or the slot 22-3 is arranged. Optionally, the slot 22 is not limited to the slot 22-1 and the slot 22-3, and may further include more slots. Arranging the slot with a small width (for example, 1 mm to 1.5 mm) on the metal frame may be equivalent to connecting a small capacitor in series between the metal frames on both sides of the slot.

The plurality of tuning switches may include a first tuning switch arranged on the side metal frame 11-1, such as a tuning switch 25 (SW2). The first tuning switch is not limited to the tuning switch 25 (SW2), and may include a plurality of tuning switches. The plurality of tuning switches may further include a second tuning switch and a third tuning switch that are arranged on the bottom metal frame 11-7. The second tuning switch may be arranged on a first side of the slot 22, and the third tuning switch may be arranged on a second side of the slot 22. The first side is closer to the side metal frame 11-1 than the second side. The second tuning switch may include a tuning switch 27 (SW3) and a tuning switch 29 (SW4). Optionally, the second tuning switch may include only a tuning switch 27 (SW3) or only a tuning switch 29 (SW4). The third tuning switch may include a tuning switch 31 (SW5). The third tuning switch is not limited to the tuning switch 31 (SW5), and may include a plurality of tuning switches. In this application, each of the tuning switches may be formed by combining a plurality of single pole single throw (single pole single throw, SPST) switches.

The feeder 23 can be connected to an active component such as a battery on the PCB through a cable 37. The feeder 23 can separately feed the side metal frame and the bottom metal frame based on the scene, so as to switch between the portrait mode and the landscape mode. The side metal frame 11-1 may be provided with a feed point S, and the bottom metal frame 11-7 may be provided with a feed point T. The feeder 23 can be configured to selectively connect the feed point S or the feed point T. In the free space FS scene, the feeder 23 may be connected to the feed point S on the side metal frame 11-1. In the handheld (such as BHH) scene, the feeder 23 may be connected to the feed point T on the bottom metal frame 11-7. In this way, after determining whether a current scene of the electronic device 10 is a free space FS scene or a handheld (such as BHH) scene, the electronic device 10 can control the feeder 23 to connect the feed point S or the feed point T.

Separate feeding of the side metal frame and the bottom metal frame can be implemented through the switch 22 (SW1). Specifically, the feeder 23 may be connected to the switch 22 (SW1). The switch 22 may be a single pole double throw (single pole double throw, SPDT) switch, and may have two stationary terminals: a stationary terminal A and a stationary terminal B. The feed point S is connected to the stationary terminal A of the switch 22. The feed point T is connected to the stationary terminal B of the switch 22. The switch 22 can be configured to selectively connect the feeder 23 to the feed point S or the feed point T by turning on different stationary terminals.

In the free space FS scene, the electronic device 10 can control the switch 22 to turn on the stationary terminal A, that is, control the feeder 23 to connect the feed point S of the side metal frame 11-1. The feed point S may be referred to as a first feed point. In this case, the side metal frame 11-1 is fully excited and can be used as a radiator to generate radiation outwards. A radiation mode of the antenna apparatus provided in Embodiment 1 is a portrait mode, and free space radiation efficiency is good. In this case, the first tuning switch (such as the tuning switch 25) arranged on the side metal frame 11-1 can be configured to switch a radiation frequency band of the side metal frame 11-1, for example, switch between low frequency bands such as LTE B5, LTE B8, and LTE B28.

In the handheld (such as BHH) scene, the electronic device 10 can control the switch 22 to turn on the stationary terminal B, that is, control the feeder 23 to connect the feed point T of the bottom metal frame 11-7. The feed point T may be referred to as a second feed point. In this case, the bottom metal frame 11-7 can be used as a radiator to generate radiation outwards. A radiation mode of the antenna apparatus provided in Embodiment 1 is a landscape mode, which is not affected by holding the slot 21-1 in the hand, and the handheld radiation efficiency is good. The second tuning switch and the third tuning switch can be configured to switch the radiation frequency band of the bottom metal frame 11-7.

A logic controller controls which stationary terminal of the switch 22 is turned on. The logic controller can receive a control signal from a CPU of the electronic device. The control signal can be used to control which stationary terminal of the switch 22 is turned on. When the electronic device is in the FS scene, the control signal can instruct the logic controller to control the switch 22 to turn on the stationary terminal A. When the electronic device is in the handheld scene, the control signal can instruct the logic controller to control the switch 22 to turn on the stationary terminal B. A manner of determining the free space FS scene and the handheld (such as BHH) scene is described in the following content. Details are not described herein.

In other words, the switch 22 can implement the separate feeding manner, and separately feeds the side metal frame and the bottom metal frame based on different scenes, so as to switch between the portrait mode and the landscape mode.

To ensure that in the landscape mode, the bottom metal frame 11-7 is used as a main radiator to generate radiation outwards, and prevent the bottom metal frame 11-7 and a side metal frame 11-3 connected to the bottom metal frame 11-7 from forming a whole radiator for generating radiation, a first ground point such as a ground point 35 (GND1) may be arranged between the side metal frame 11-3 and the bottom metal frame 11-7. Here, there may be two cases between the side metal frame 11-3 and the bottom metal frame 11-7. Case 1: The first ground point is arranged at a position on the side metal frame 11-3 adjacent to the bottom metal frame. Adjacency means that a vertical distance between the position and the bottom metal frame 11-7 is less than a first value, for example, 6 mm. Case 2: The first ground point is arranged at a position on the bottom metal frame 11-7 adjacent to the side metal frame 11-3. Adjacency means that a vertical distance between the position and the side metal frame 11-3 is less than a second value, for example, 6 mm.

To isolate the side metal frame 11-1 and the bottom metal frame 11-7 and avoid interference between the portrait mode and the landscape mode, a second ground point such as a ground point 33 (GND2) may be further arranged between the side metal frame 11-1 and the bottom metal frame 11-7. In other words, the second ground point is arranged between the feed point S and the feed point T. Here, for the meaning of "between the side metal frame 11-1 and the bottom metal frame 11-7", refer to the foregoing similar description of "between the side metal frame 11-3 and the bottom metal frame 11-7". Details are not described herein again. Optionally, the tuning switch 27 (SW3) may be switched to 0 ohm grounding instead of the ground point 33 (GND2).

FIG. 4B is a schematic diagram of a principle of the portrait mode. As shown in FIG. 4B, in the free space FS scene, the metal frame shown in FIG. 4B may use an inverted F antenna (inverted F antenna, IFA) design, and resonance is generated by the side metal frame 11-1. In this case, a radiation mode of the antenna apparatus provided in Embodiment 1 is a portrait mode. FIG. 4C is a schematic diagram of a principle of the lateral mode. As shown in FIG. 4C, in the handheld scene, resonance may be generated by the bottom metal frame 11-7. For example, the metal frame between T and D shown in FIG. 4C can use a composite right/left handed (composite right/left handed, CRLH) mode to generate resonance. In this case, a radiation mode of the antenna apparatus provided in Embodiment 1 is a lateral mode.

The antenna apparatus provided in Embodiment 1 may be a low band (low band, LB) antenna, and its working frequency may be 690 MHz to 960 MHz. Without limitation to the LB, the antenna apparatus may alternatively work in another frequency band, for example, intermediate and high frequencies (such as 1700 MHz to 2700 MHz), which can be adapted by adjusting the length of the radiator.

Extended Implementation of Embodiment 1

A slot 21-3 may be arranged on the side metal frame 11-3. Here, the slot 21-3 may be referred to as a third slot. The slot 21-3 and the slot 21-1 may be symmetrically arranged on the side metal frame 11-3 and the side metal frame 11-1 respectively, meeting an aesthetic requirement of symmetrical slot arrangement in terms of appearance.

Figure 5:
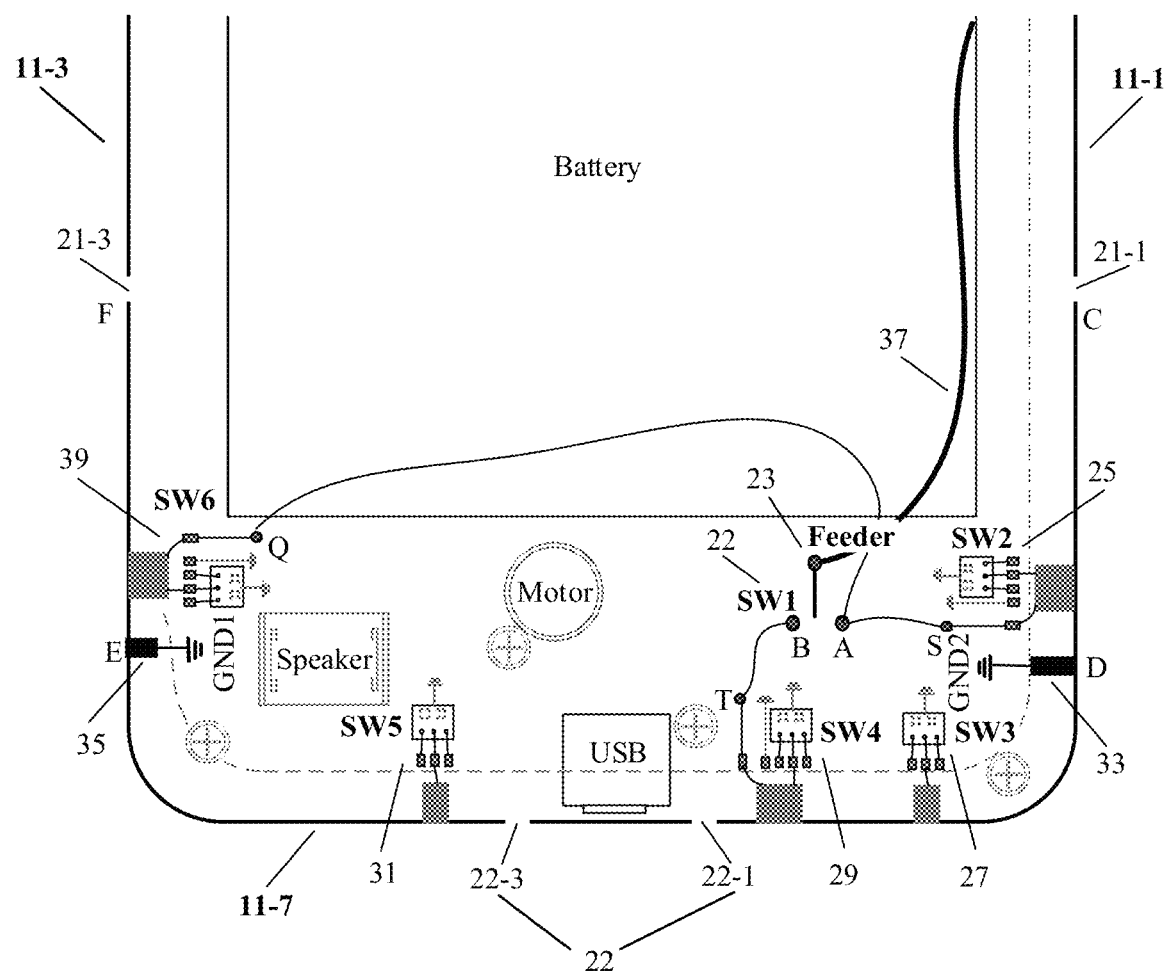
FIG. 5 is a schematic diagram of an extended implementation of Embodiment 1.

As shown in FIG. 5, the side metal frame 11-3 can alternatively be used as a radiator to generate radiation outwards. In other words, both the side metal frame 11-3 and the side metal frame 11-1 may be used as radiators in the portrait mode, so as to further improve the free space radiation efficiency.

Specifically, similar to the design of the side metal frame 21-1, a fourth tuning switch such as a tuning switch 39 (SW6), and a feed point Q may be arranged on the side metal frame 11-3. The fourth tuning switch can be configured to switch the radiation frequency band of the side metal frame 11-3, for example, switch between low frequency bands such as LTE B5, LTE B8, and LTE B28. In the free space FS scene, the switch 22 turns on the stationary terminal A, and the feeder 23 is connected to the feed point S on the side metal frame 11-1 and the feed point Q on the side metal frame 11-3. Here, the feed point Q may be referred to as a third feed point. Therefore, in the free space FS scene, the side metal frame 11-3 can alternatively be used as a radiator to generate radiation outwards.

Embodiment 2

In this embodiment, under the condition that slots are arranged on both a side metal frame and a bottom metal frame, a state (such as an on (on) state or an off (off) state) of a tuning switch connected to the metal frame is changed to adjust whether a radiation mode of a metal frame antenna is a landscape mode or a portrait mode, so as to take into account both free space radiation efficiency and handheld radiation efficiency. The tuning switch may be switched to the on (on) state by switching to 0 ohm grounding, and therefore the on (on) state may also be referred to as a grounded state. The tuning switch in the off (off) state can be used for frequency modulation.

Figure 6A:
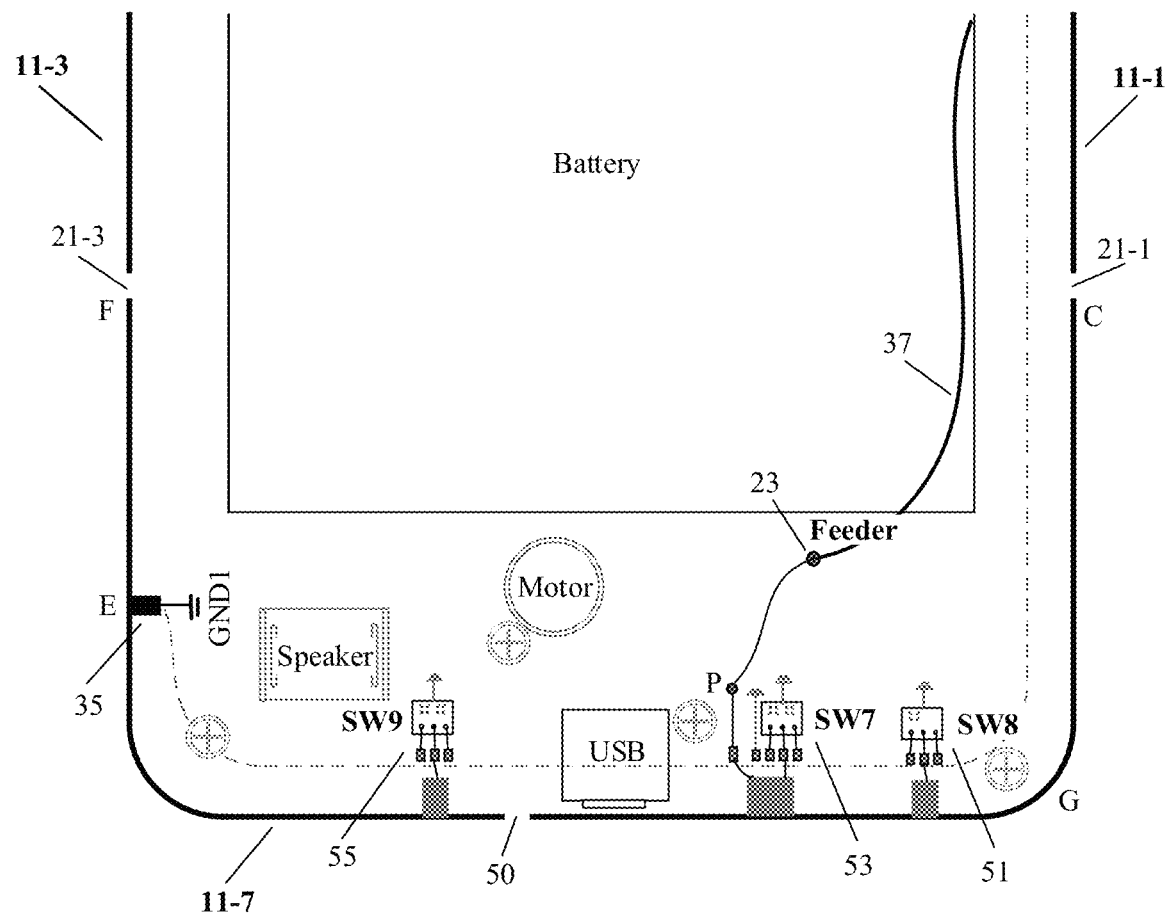
FIG. 6A is a schematic diagram of an antenna apparatus according to Embodiment 2.
Figure 6B:
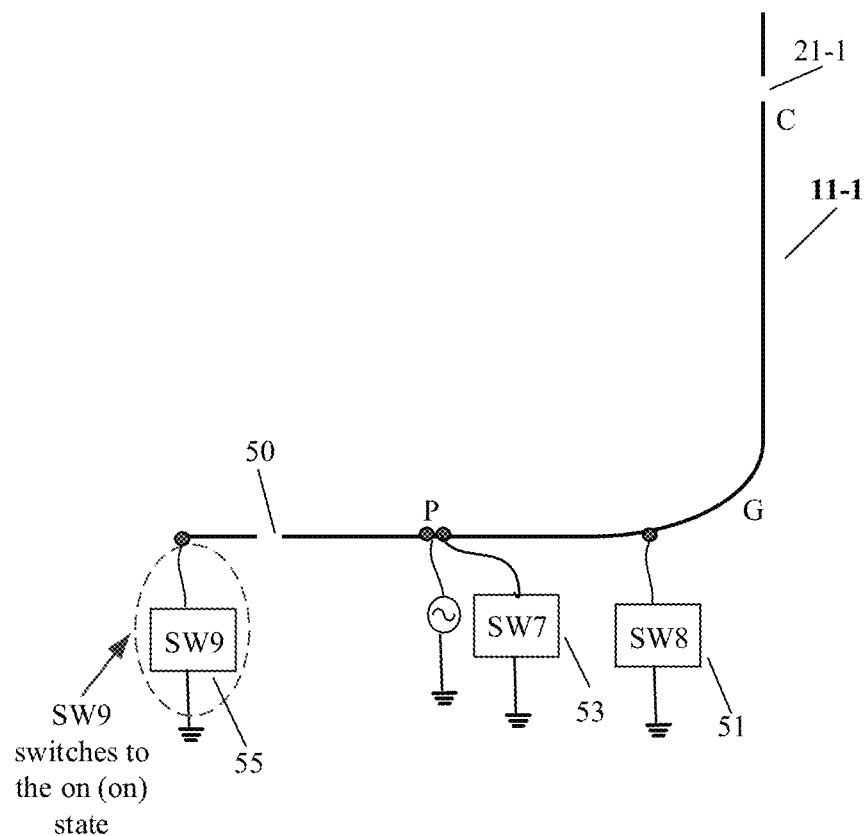
FIG. 6B is a schematic diagram of a principle of an antenna apparatus in a portrait mode according to Embodiment 2.
Figure 6C:
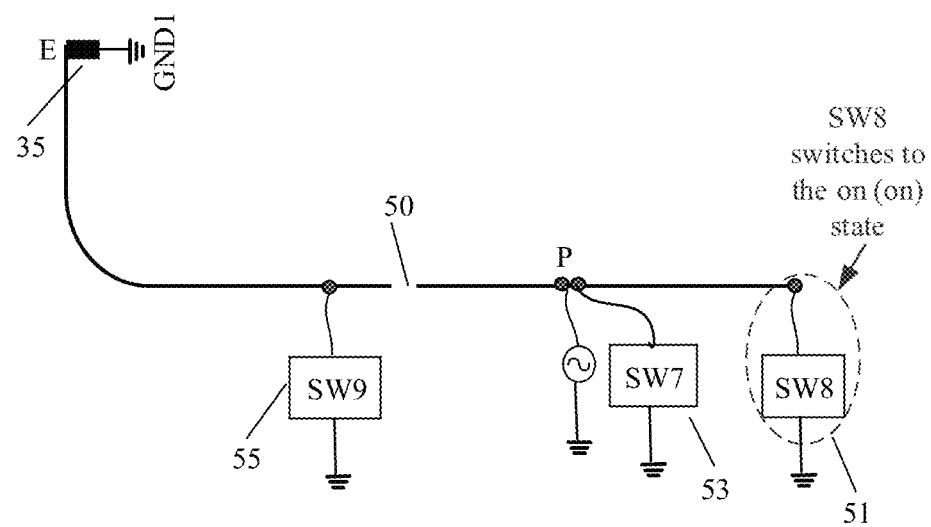
FIG. 6C is a schematic diagram of a principle of an antenna apparatus in a lateral mode according to Embodiment 2.

FIG. 6A to FIG. 6C show examples of an antenna apparatus according to Embodiment 2. FIG. 6A is a schematic diagram of an antenna model of a metal frame antenna designed in an electronic device. FIG. 6B is a schematic diagram of a principle of the antenna apparatus in a portrait mode. FIG. 6C is a schematic diagram of a principle of the antenna apparatus in a landscape mode. As shown in FIG. 6A to FIG. 6C, the antenna apparatus may include: a side metal frame 11-1, a bottom metal frame 11-7, a feeder 23, and a plurality of tuning switches connected to the metal frame.

Figure 7:
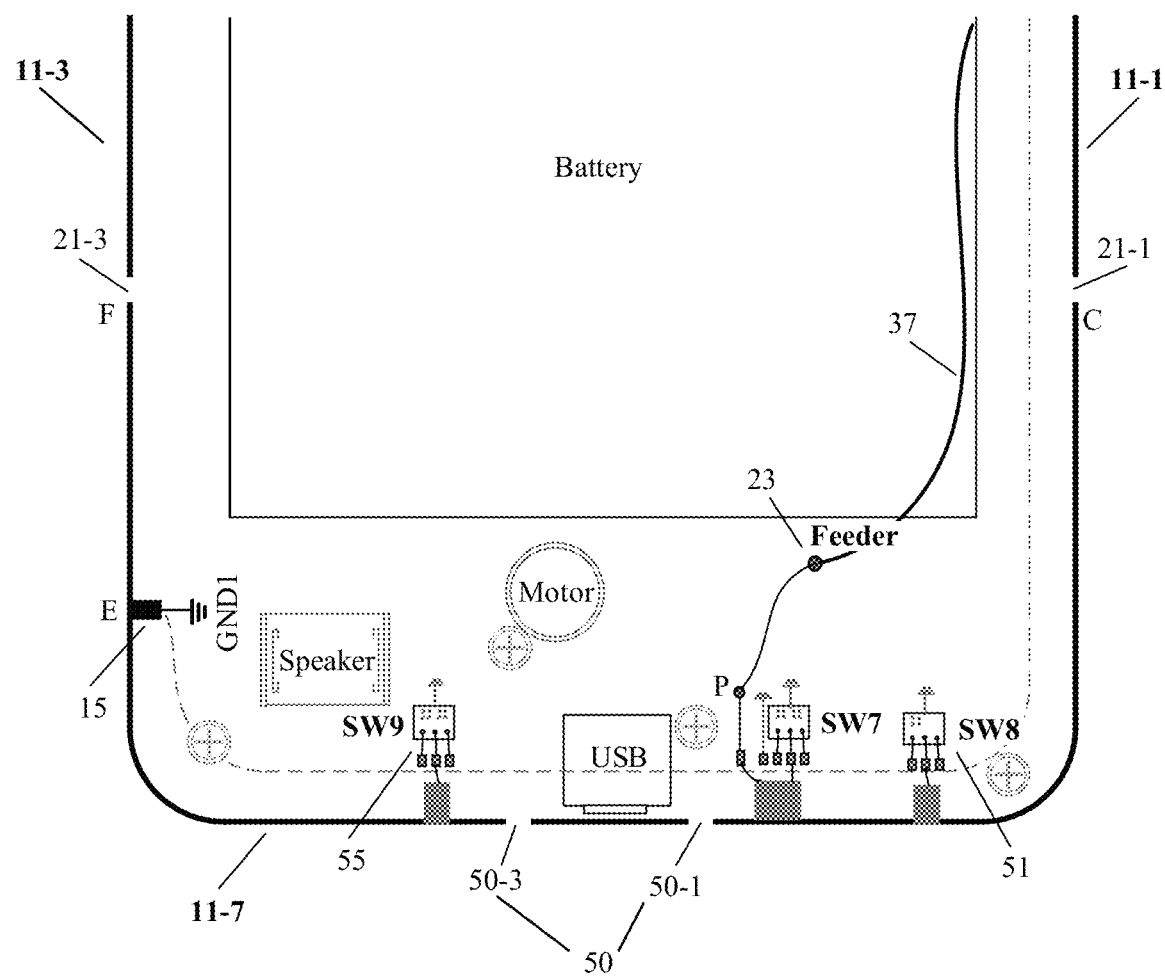
FIG. 7 is a schematic diagram of an extended implementation of Embodiment 2.

A slot 21-1 may be arranged on the side metal frame 11-1. A slot 50 may be arranged on the bottom metal frame 11-7. Here, the slot 21-1 may be referred to as a fourth slot, and the slot 50 may be referred to as a fifth slot. Arranging the slot with a small width (for example, 1 mm to 1.5 mm) on the metal frame may be equivalent to connecting a small capacitor in series. Optionally, as shown in FIG. 7, the slot 50 may include a plurality of slots, such as a slot 50-1 and a slot 50-3.

The feeder 23 may be connected to a feed point P. Here, the feed point P may be referred to as a fourth feed point. The feeder 23 can be connected to an active component such as a battery on the PCB through a cable 37. The feed point P may be arranged on the metal frame between the slot 21-1 and the slot 50. Specifically, the feed point P may be arranged on the bottom metal frame between the slot 21-1 and the slot 50, as shown in FIG. 6A. The metal frame between the slot 21-1 and the slot 50 may include two parts. One part is the bottom metal frame between the slot 21-1 and the slot 50, and the other part is the side metal frame between the slot 21-1 and the slot 50.

The plurality of tuning switches may include a fifth tuning switch such as a tuning switch 51 (SW8), and a sixth tuning switch such as a tuning switch 55 (SW9). The fifth tuning switch (such as SW8) may be arranged on the metal frame between the slot 21-1 and the slot 50. The sixth tuning switch (such as SW9) may be arranged on the bottom metal frame 11-7. The fifth tuning switch may be arranged on a first side of the feed point P, and the sixth tuning switch may be arranged on a second side of the feed point P. The first side is closer to the side metal frame 11-1 than the second side. Specifically, the sixth tuning switch and the feed point P may be separated by the slot 50.

In addition, the plurality of tuning switches may further include a seventh tuning switch, such as a tuning switch 53 (SW7). The seventh tuning switch may be arranged at a position adjacent to the feed point P on the metal frame between the slot 21-1 and the slot 50, and can be used for impedance matching of the feeding. Because the radiator in the portrait mode and the radiator in the landscape mode are different, the antenna impedance is different, and impedance matching for different transmission lines is needed.

In the free space FS scene, the fifth tuning switch (such as SW8) may be in an off (off) state, and the sixth tuning switch (such as SW9) may be in an on (on) state. In this case, the side metal frame 11-1 is fully excited and can be used as a radiator to generate radiation outwards. In this case, a working mode of the metal frame antenna is a portrait mode, and free space radiation efficiency is good. The fifth tuning switch (such as SW8) can be further configured to switch the radiation frequency band of the side metal frame 11-1 in the portrait mode, for example, switch between low frequency bands such as LTE B5, LTE B8, and LTE B28.

In the handheld (such as BHH) scene, the fifth tuning switch (such as SW8) may be in an on (on) state, and the sixth tuning switch (such as SW9) may be in an off (off) state. In this case, the bottom metal frame 11-7 can be used as a radiator to generate radiation outwards. In this case, the working mode of the metal frame antenna is a landscape mode, which is not affected by holding the slot 21-1 in the hand, and the handheld radiation efficiency is good. The sixth tuning switch (such as SW9) can be further configured to switch the radiation frequency band of the bottom metal frame 11-7 in the landscape mode, for example, switch between low frequency bands such as LTE B5, LTE B8, and LTE B28.

In other words, the fifth tuning switch (such as SW8) and the sixth tuning switch (such as SW9) can be selectively in an on (on) state or an off (off) state. In this way, by switching the states (such as the on (on) state or the off (off) state) of the fifth tuning switch (such as SW8) and the sixth tuning switch (such as SW9) that are arranged on both sides of the feed point P, the radiation mode of the metal frame antenna can be switched to the portrait mode or the landscape mode.

The logic controller can control whether to switch the states of the fifth tuning switch (such as SW8) and the sixth tuning switch (such as SW9) to the on (on) state or the off (off) state. The logic controller may be connected to the fifth tuning switch (such as SW8) and the sixth tuning switch (such as SW9). The logic controller can receive a control signal from a CPU of the electronic device. The control signal can be used to control the state switching of the fifth tuning switch (such as SW8) and the sixth tuning switch (such as SW9). When the electronic device is in the FS scene, the control signal can instruct the logic controller to control the fifth tuning switch (such as SW8) to switch to the off (off) state, and the sixth tuning switch (such as SW9) to switch to the on (on) state. When the electronic device is in the handheld scene, the control signal can instruct the logic controller to control the fifth tuning switch (such as SW8) to switch to the on (on) state, and the sixth tuning switch (such as SW9) to switch to the off (off) state. A manner of determining the free space FS scene and the handheld (such as BHH) scene is described in the following content. Details are not described herein.

To ensure that in the landscape mode, the bottom metal frame 11-7 is used as a main radiator to generate radiation outwards, and prevent the bottom metal frame 11-7 and a side metal frame 11-3 connected to the bottom metal frame 11-7 from forming a whole radiator for generating radiation, a ground point 35 (GND1) may be arranged between the side metal frame 11-3 and the bottom metal frame 11-7. For the meaning of "between the side metal frame 11-3 and the bottom metal frame 11-7", refer to the foregoing description. Details are not described herein again.

FIG. 6B is a schematic diagram of a principle of the portrait mode. As shown in FIG. 6B, in the free space FS scene, the sixth tuning switch (such as SW9) is switched to the on (on) state, which is equivalent to grounding. In this case, the metal frame shown in FIG. 6B may use an inverted F antenna (inverted F antenna, IFA) design, and low-frequency resonance may be mainly generated by the side metal frame 11-1. In this case, a radiation mode of the antenna apparatus provided in Embodiment 2 is a portrait mode. FIG. 6C is a schematic diagram of a principle of the lateral mode. As shown in FIG. 6C, in the handheld scene, the fifth tuning switch (such as SW8) is switched to the on (on) state, which is equivalent to grounding. In this case, resonance may be generated by the bottom metal frame 11-7. For example, the metal frame between 51 and P may generate resonance in the CRLH mode, and a stub between 35 and 50 generates a parasitic mode to help improve radiation efficiency. In this case, a radiation mode of the antenna apparatus provided in Embodiment 2 is a lateral mode.

Without limitation to the low frequency band, the antenna apparatus provided in Embodiment 2 may alternatively work in another frequency band, for example, intermediate and high frequency band (such as 1700 MHz to 2700 MHz), which can be adapted by adjusting the length of the radiator.

Extended Implementation of Embodiment 2

Figure 8A:
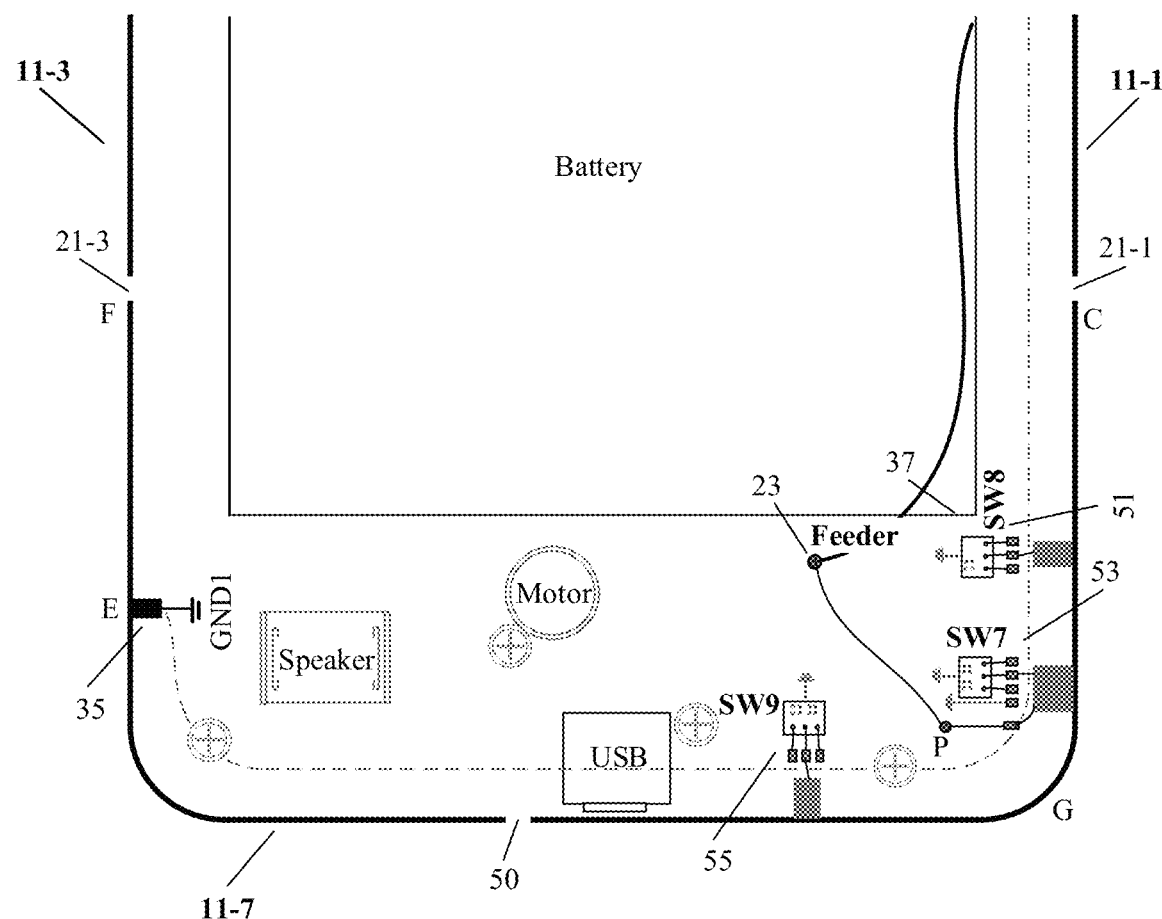
FIG. 8A is a schematic diagram of another extended implementation of Embodiment 2.

Unlike the arrangement of the feed point P on the bottom metal frame between the slot 21-1 and the slot 50 shown in FIG. 6A, as shown in FIG. 8A, the feed point P may be arranged on the side metal frame between the slot 21-1 and the slot 50. In this case, the fifth tuning switch on the first side of the feed point, such as the tuning switch 51 (SW8), is also arranged on the side metal frame between the slot 21-1 and the slot 50 accordingly. Optionally, the sixth tuning switch on the second side of the feed point, such as the tuning switch 55 (SW9), and the feed point P may no longer be separated by the slot 50.

The bottom metal frame between the slot 21-1 and the slot 50 is a metal frame between the slot 50 and a position G. The side metal frame between the slot 21-1 and the slot 50 is a metal frame between the position G and the slot 21-1. The position G is a joint between the bottom metal frame 11-7 and the side metal frame 11-1.

In the free space FS scene, the fifth tuning switch (such as SW8) may be in an off (off) state, and the sixth tuning switch (such as SW9) may be in an on (on) state. In this case, the side metal frame 11-1 is fully excited and can be used as a radiator to generate radiation outwards. A radiation mode of the antenna apparatus provided in Embodiment 2 is a portrait mode, and free space radiation efficiency is good. The fifth tuning switch (such as SW8) can be further configured to switch the radiation frequency band of the side metal frame 11-1 in the portrait mode.

In the handheld (such as BHH) scene, the fifth tuning switch (such as SW8) may be in an on (on) state, and the sixth tuning switch (such as SW9) may be in an off (off) state. In this case, the bottom metal frame 11-7 can be used as a radiator to generate radiation outwards. A radiation mode of the antenna apparatus provided in Embodiment 2 is a landscape mode, which is not affected by holding the slot 21-1 in the hand, and the handheld radiation efficiency is good. The sixth tuning switch (such as SW9) can be further configured to switch the radiation frequency band of the bottom metal frame 11-7 in the landscape mode.

Figure 8B:
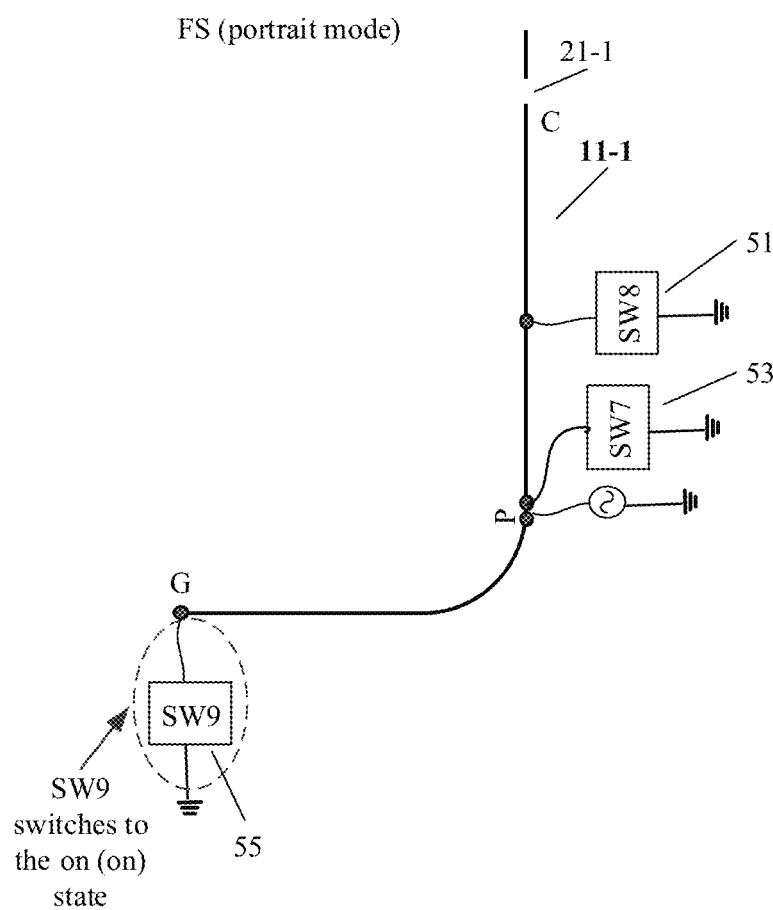
FIG. 8B is a schematic diagram of a principle of an antenna apparatus shown in FIG. 8A in a portrait mode.
Figure 8C:
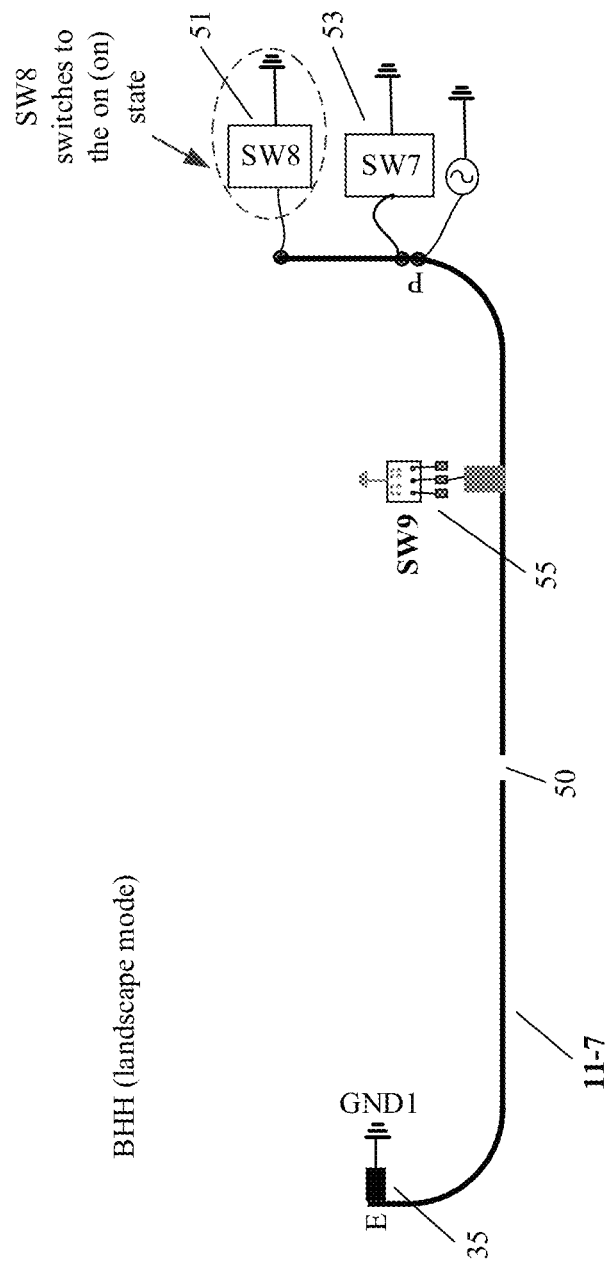
FIG. 8C is a schematic diagram of a principle of an antenna apparatus shown in FIG. 8A in a lateral mode.

FIG. 8B is a schematic diagram of a principle of the portrait mode. As shown in FIG. 8B, in the free space FS scene, the sixth tuning switch (such as SW9) is switched to the on (on) state, which is equivalent to grounding. In this case, the metal frame shown in FIG. 8B may use an inverted F antenna (inverted F antenna, IFA) design, and low-frequency resonance may be mainly generated by the side metal frame 11-1. In this case, a radiation mode of the antenna apparatus provided in Embodiment 2 is a portrait mode. FIG. 8C is a schematic diagram of a principle of the lateral mode. As shown in FIG. 8C, in the handheld scene, the fifth tuning switch (such as SW8) is switched to the on (on) state, which is equivalent to grounding. In this case, low-frequency resonance may be mainly generated by the bottom metal frame 11-7. In this case, a radiation mode of the antenna apparatus provided in Embodiment 2 is a lateral mode.

Figure 9A:
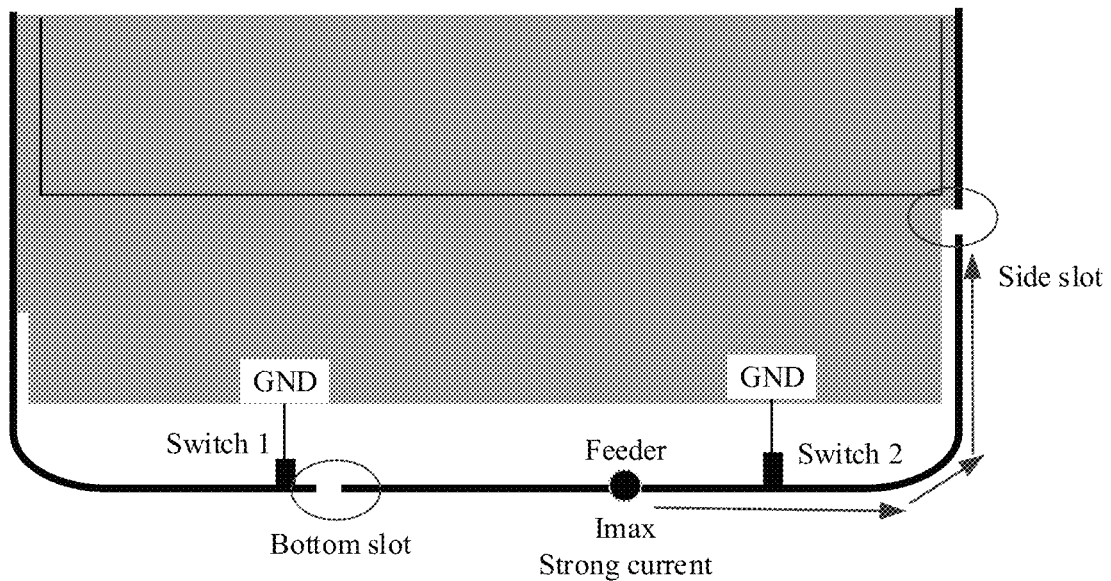
FIG. 9A is a schematic diagram of a low-frequency working state of an antenna apparatus of Embodiment 2 in a free space scene.

FIG. 9A shows a low-frequency working state of an antenna apparatus provided in Embodiment 2 in a free space scene. As shown in FIG. 9A, to ensure antenna performance in a free space scene, it is necessary to fully excite the portrait mode. Switch 2 may be switched to an off (off) state, and switch 1 may be switched to an on (on) state. In this way, a strong electric field is formed at the slot (such as the slot 21-1) on the side metal frame, so the portrait mode is strong. The antenna apparatus can generate resonance at B5, B8, and B28, and has good system efficiency.

Figure 9B:
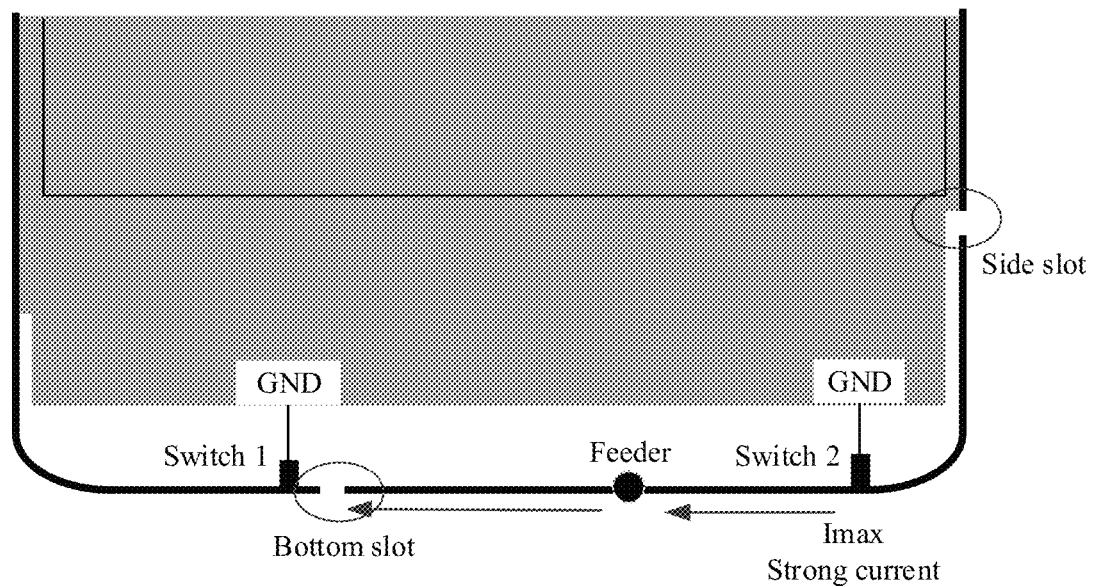
FIG. 9B is a schematic diagram of a low-frequency working state of an antenna apparatus of Embodiment 2 in a handheld scene.

FIG. 9B shows a low-frequency working state of an antenna apparatus provided in Embodiment 2 in a handheld scene. As shown in FIG. 9B, to ensure antenna performance in the handheld scene and reduce impact of the hand-holding, it is necessary to weaken the portrait mode and strengthen the landscape mode. Switch 2 may be switched to an on (on) state, and switch 1 may be switched to an off (off) state. In this way, a strong electric field is formed at the slot (such as the slot 50) on the bottom metal frame, which effectively excites the lateral mode, thereby reducing the impact of the hand-holding. The antenna apparatus may have good system efficiency in both the BHHL scene and the BHHR scene. The BHHL scene and the BHHR scene are two typical handheld scenes. BHHL refers to holding the electronic device 10 in the left hand close to the left face, and BHHR refers to holding the electronic device 10 in the right hand close to the right face.

The switch 1 in FIG. 9A and FIG. 9B may be the sixth tuning switch (such as SW9) described in Embodiment 2, and the switch 2 may be the fifth tuning switch (such as SW8) described in Embodiment 2.

The antenna apparatus provided in the foregoing embodiments may also be applied to another side metal frame of the electronic device 10, such as the side metal frame 11-3, and may also be applied to the top metal frame 11-5 of the electronic device 10. That is, in the foregoing embodiments, the radiator in the portrait mode may be the side metal frame 11-3, and the radiator in the landscape mode may be the top metal frame 11-5.

In the foregoing embodiments, the free space scene and the handheld scene are described, and the radiation modes (the portrait mode or the landscape mode) of the antenna are different in different scenes. In an implementation, the electronic device 10 can determine whether a handset 16 is turned on, and if the handset 16 is turned on, it can be determined that a user is holding the electronic device 10 in the hand to make a call, so that the current scene can be determined to be a handheld scene; otherwise, the current scene can be determined to be a free space scene. In another implementation, the electronic device can determine whether the user is close to the electronic device 10 based on distance data collected by an optical proximity sensor 17 from the user to the electronic device 10. If a distance indicated by the distance data is less than a specific threshold (for example, 1 cm), it can be determined that the user is holding the electronic device 10 in the hand close to the user's body (for example, the user's head), so that the current scene can be determined to be a handheld scene; otherwise, the current scene can be determined to be a free space scene. In addition to these two implementations, the electronic device 10 can further determine the current scene in another manner, which is not limited in this application.

Figure 10:
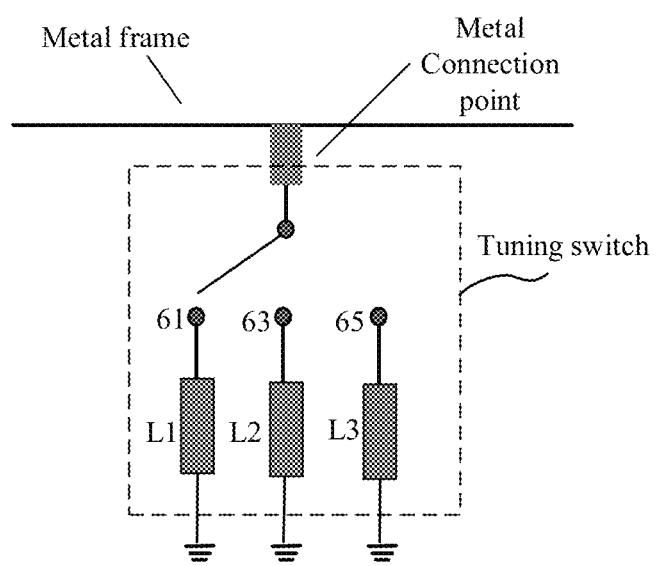
FIG. 10 is a schematic structural diagram of a tuning switch according to this application.

The tuning switches described in the foregoing embodiments, such as the tuning switch 25 (SW2), the tuning switch 27 (SW3), and the tuning switch 51 (SW8), may be shown in FIG. 10, and may have a plurality of ground points, such as a ground point 61, a ground point 63, and a ground point 65. Each ground point may be connected in series to an RLC lumped device. For example, the ground point 61 is connected in series to a lumped device L1, the ground point 63 is connected in series to a lumped device L2, and the ground point 65 is connected in series to a lumped device L3. Lumped parameter values of L1, L2, and L3 are different. The tuning switch can selectively connect the ground points that are connected in series to different lumped devices, so as to implement frequency adjustment.

As described in the foregoing embodiments, switching the tuning switch to an off (off) state may mean that the tuning switch is in a disconnected state. Switching the tuning switch to an on (on) state may mean that the tuning switch turns on a specific lumped device. For example, the tuning switch turns on a 0 ohm lumped device to implement closed grounding.

It can be learned that, in the antenna design solution provided in this application, slots are arranged on both the bottom metal frame and the side metal frame to balance the free space radiation efficiency and the handheld radiation efficiency. In the free space scene, the portrait mode of the antenna is strong, and the free space radiation efficiency is good. When an electronic device 10 is held in the hand, the lateral mode of the antenna is strong, and the handheld radiation efficiency is good.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus for an electronic device, the antenna apparatus comprising:
   a first side metal frame of the electronic device, wherein the first side metal frame has a first slot;
   a bottom metal frame of the electronic device, wherein the bottom metal frame has a second slot, and wherein a ground point is arranged between the bottom metal frame and a second side metal frame of the electronic device;
   a feeder connected to a first feed point, wherein the first feed point is arranged on a metal frame between the first slot and the second slot; and
   a plurality of tuning switches including a first tuning switch connected to the metal frame between the first slot and the second slot, and a second tuning switch connected to the bottom metal frame, wherein the first tuning switch is connected to a first side of the first feed point, wherein the second tuning switch is connected to a second side of the first feed point, and wherein the first side is closer to the first side metal frame than the second side, wherein the first tuning switch is configured to selectively turn off or on, and wherein the second tuning switch is configured to selectively turn off or on.

2. The antenna apparatus of claim 1, wherein if the first tuning switch is turned off and the second tuning switch is turned on, the first side metal frame is excited to generate radiation outwards and the first tuning switch is configured to adjust a radiation frequency band of the first side metal frame, and wherein if the first tuning switch is turned on and the second tuning switch is turned off, the bottom metal frame is excited to generate radiation outwards and the second tuning switch is configured to adjust a radiation frequency band of the bottom metal frame.

3. The antenna apparatus of claim 1, wherein the first feed point is arranged on the bottom metal frame between the first slot and the second slot, and wherein the second tuning switch and the first feed point are separated by the second slot.

4. The antenna apparatus of claim 1, wherein the first feed point is arranged on the side metal frame between the first slot and the second slot, and wherein the first tuning switch is connected to the side metal frame between the first slot and the second slot.

5. The antenna apparatus of claim 1, wherein the plurality of tuning switches further comprises a seventh tuning switch, and wherein the seventh tuning switch is connected to a position adjacent to the first feed point on the metal frame between the first slot and the second slot, and is used for impedance matching of the feeding.

6. An electronic device, comprising:
a metal frame comprising a first side metal frame, a second side metal frame, and a bottom metal frame; and
an antenna apparatus, comprising:
the first side metal frame provided with a first slot;
the bottom metal frame provided with a second slot, wherein a ground point is arranged between the bottom metal frame and the second side metal frame;
a feeder connected to a first feed point, wherein the first feed point is arranged on one of the first side metal frame and the bottom metal frame between the first slot and the second slot; and
a plurality of tuning switches including a first tuning switch connected to the metal frame between the first slot and the second slot, wherein the first tuning switch is configured to selectively turn off or on.

7. The electronic device of claim 6, wherein the plurality of tuning switches comprises a second tuning switch that is connected to the metal frame, wherein the first tuning switch is connected to a first side of the first feed point, wherein the second tuning switch is connected to a second side of the first feed point, wherein the first side is closer to the first side metal frame than the second side, and wherein the second tuning switch is configured to selectively turn off or on.

8. The electronic device of claim 7, wherein the second tuning switch and the first feed point are separated by the second slot.

9. The electronic device of claim 8, wherein the plurality of tuning switches further comprises a seventh tuning switch that is connected to a position adjacent to the first feed point on the first side metal frame or the bottom metal frame between the first slot and the second slot, and is configured to impedance match the feeder.

10. The electronic device of claim 7, wherein if the first tuning switch is turned off, and the second tuning switch is turned on, the first side metal frame is excited to generate radiation outwards and the first tuning switch is configured to adjust a radiation frequency band of the first side metal frame, and wherein if the first tuning switch is turned on and the second tuning switch is turned off, the bottom metal frame is excited to generate radiation outwards and the second tuning switch is configured to adjust a radiation frequency band of the bottom metal frame.

11. The electronic device of claim 7, wherein the first feed point is arranged on the bottom metal frame between the first slot and the second slot, and wherein the second tuning switch and the first feed point are separated by the second slot.

12. The electronic device of claim 6, wherein the first feed point is arranged on the side metal frame between the first slot and the second slot, and wherein the first tuning switch is connected to the side metal frame between the first slot and the second slot.

* * * * *